(12) United States Patent
Petri

(10) Patent No.: US 8,949,219 B2
(45) Date of Patent: *Feb. 3, 2015

(54) CONTENT MANAGEMENT SYSTEM THAT RETRIEVES DATA FROM AN EXTERNAL DATA SOURCE AND CREATES ONE OR MORE OBJECTS IN THE REPOSITORY

(71) Applicant: International Business Machines Corporation, Armonk, NY (US)

(72) Inventor: John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,996

(22) Filed: Jan. 29, 2013

(65) Prior Publication Data

US 2013/0132441 A1 May 23, 2013

Related U.S. Application Data

(63) Continuation of application No. 13/449,053, filed on Apr. 17, 2012, now Pat. No. 8,484,196, which is a continuation of application No. 11/776,705, filed on Jul. 12, 2007, now Pat. No. 8,244,713.

(51) Int. Cl.
*G06F 7/00* (2006.01)
*G06F 17/30* (2006.01)

(52) U.S. Cl.
CPC ...... *G06F 17/30011* (2013.01); *G06F 17/3051* (2013.01); *G06F 17/30607* (2013.01)
USPC .......................................... 707/713; 707/726

(58) Field of Classification Search
CPC .................. G06F 17/30011; G06F 17/30607; G06F 17/30575; G06F 17/30463; G06F 17/30867

USPC ......... 707/687, 694, 708, 713, 737, 771, 726; 705/3, 5
See application file for complete search history.

(56) References Cited

U.S. PATENT DOCUMENTS

| | | | |
|---|---|---|---|
| 6,584,459 B1 | 6/2003 | Chang et al. | |
| 6,834,287 B1 | 12/2004 | Folk-Williams et al. | |
| 7,062,475 B1 | 6/2006 | Szabo et al. | |
| 7,320,005 B2 | 1/2008 | Li et al. | |
| 7,653,731 B2 | 1/2010 | Martynov et al. | |

(Continued)

OTHER PUBLICATIONS

IBM DB2 v9 XML Guide, 2006.

(Continued)

*Primary Examiner* — MD. I Uddin
(74) *Attorney, Agent, or Firm* — Martin & Associates, LLC

(57) ABSTRACT

A content management system (CMS) provides a way to include data from an external source as an object in the repository managed by the CMS. The CMS includes an external data mechanism that processes a document with a query to a data source external to the repository. The external data mechanism executes the query, and creates one or more objects in the repository according to the type of data returned. Each object containing data returned from the query is linked to that query via a formal relationship in the CMS. When an object that has a formal relationship with a query is checked out of the repository, the query corresponding to the object may be executed, and the data returned from the query may be stored in the object. Alternatively, the data may be used directly if a corresponding lifecycle policy indicates the corresponding query should not be executed.

4 Claims, 11 Drawing Sheets

(56) References Cited

U.S. PATENT DOCUMENTS

| | | |
|---|---|---|
| 7,912,816 B2 | 3/2011 | Guha et al. |
| 8,290,947 B2 | 10/2012 | Brette et al. |
| 2004/0015408 A1 | 1/2004 | Rauen et al. |
| 2005/0203876 A1 | 9/2005 | Cragun et al. |
| 2006/0003753 A1 | 1/2006 | Baxter |
| 2007/0061487 A1 | 3/2007 | Moore et al. |
| 2007/0271275 A1 | 11/2007 | Fassette et al. |
| 2008/0275868 A1 | 11/2008 | Zer |

OTHER PUBLICATIONS

"What is Content Management", pp. 1-6, printed from http://www.providersedge.com/docs/km_articles_What_is_Content_Management.pdf, on Aug. 15, 2007.

Dare Obasanjo, "An Exploration of XML in Database Management Systems", pp. 1-10, printed from http://www.25hoursaday.com/StoringAndQueryingXML.html, on Aug. 15, 2007.

Michael D. Thomas, "XML in an RDBMS World", printed from http://www.ibiblio.org/mdthomas/downloads/xml_in_a_rdbms_world.ppt, on Aug. 15, 2007.

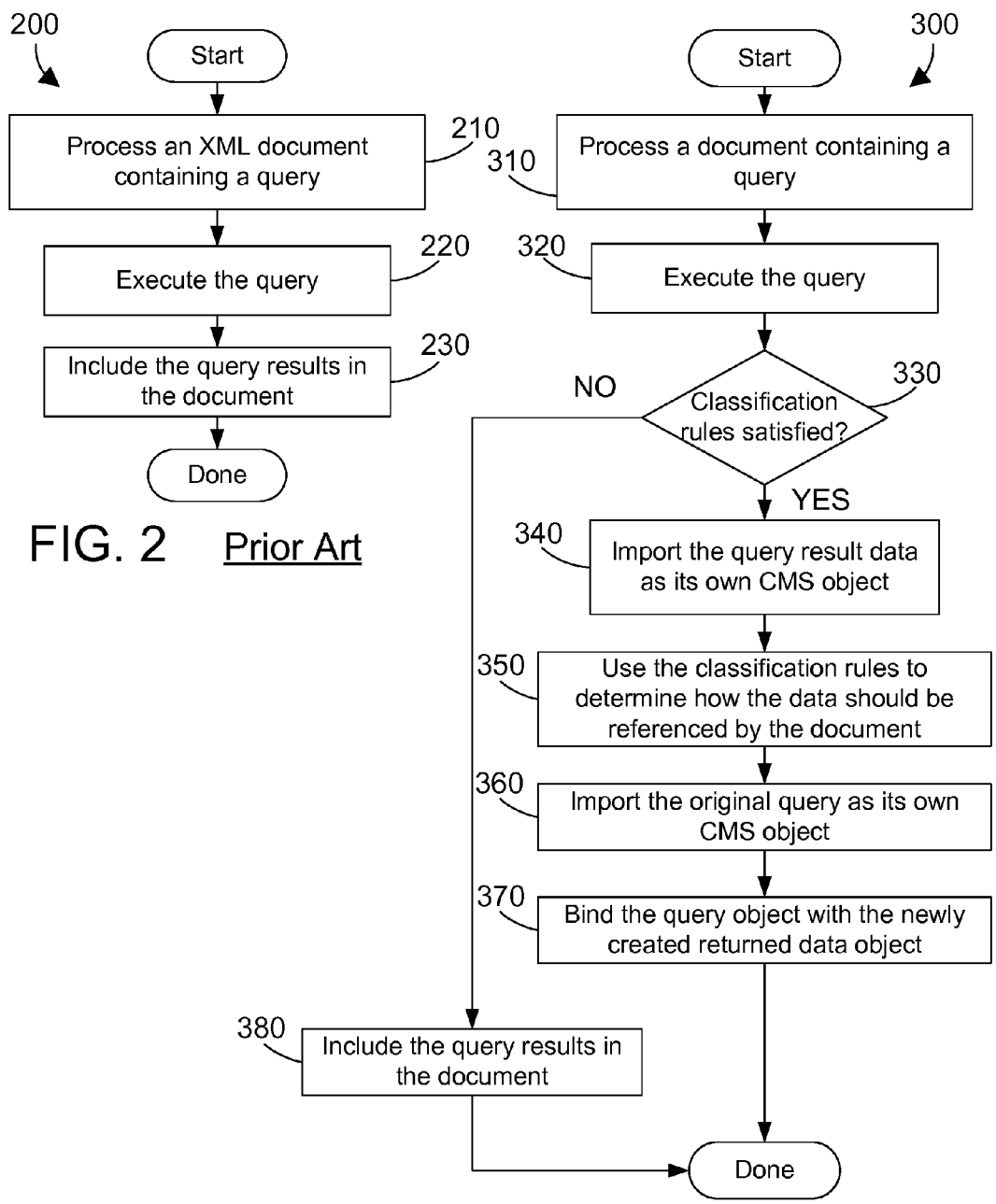

```
<StudyData>
    <Query type "study_data">
        <Condition operator "AND">
            <Condition name "study" operator "contains">
                <Value val "DrugX"/>
            </Condition>
            <Condition name "format" operator "EQ">
                <Value val "image/jpg"/>
            </Condition>
        </Condition>
        <ResultField name "format" />
        <ResultField name "name" />
        <ResultField name "content" />
    </Query>
    <Query type "study_data">
        <Condition operator "AND">
            <Condition name "study" operator "contains">
                <Value val "DrugX"/>
            </Condition>
            <Condition name "section" operator "EQ">
                <Value val "adverse_affects"/>
            </Condition>
        </Condition>
        <ResultField name "format" />
        <ResultField name "name" />
        <ResultField name "study" />
        <ResultField name "xml_content" />
    </Query>
</StudyData>
```

| Applicability 910 | Conditions 920 | Instructions 930 |
|---|---|---|
| child::Query[attribute::type 'study_data'] | <RuleCondition ref "Instruction 1" targetField "content"><br>  <Condition type = "resultField" Name "format" operator "EQ"><br>    <Value val "image/jpg"/><br>  </Condition><br></RuleCondition><br><Rule Condition ref "Instruction 2" targetField "xml_content"><br>  <Condition type "resultField" Name "format" operator "EQ"><br>    <Value val "text/xml"/><br>  </Condition><br></RuleCondition> | <Instruction name "Instruction 1"><br>  <ImportDescriptor><br>    <Attribute name "name"><br>      <Value resultField "name"/><br>    </Attribute><br>    <Attribute name "study_type"><br>      <Value resultField "study"/><br>    </Attribute><br>    <Attribute name "title"><br>      <Value val "My literal title"/><br>    </Attribute><br>  </ImportDescriptor><br>  <GeneratedContent type "link" context "replace"><br>    <CustomTag name "a" linkAttribute "href"><br>      <Attribute name "title"><br>        <Value resultField "name"/><br>      </Attribute><br>      <Content><br>        <Value resultField "name"/><br>      </Content><br>    </CustomTag><br>  </GeneratedContent><br></Instruction><br><Instruction name "Instruction 2"><br>  <ImportDescriptor><br>    <Attribute name "name"><br>      <Value resultField "name"/><br>    </Attribute><br>    <Attribute name "study_type"><br>      <Value resultField "study"/><br>    </Attribute><br>    <Attribute name "title"><br>      <Value val "My literal title"/><br>    </Attribute><br>  </ImportDescriptor><br>  <GeneratedContent type "include" context "replace"><br></Instruction> |

| Attribute Name | Value |
|---|---|
| Object_id | 5898822 |
| Name | DrugX_image_query |

```
<Query type "study_data">
    <Condition operator "AND">
        <Condition name "study" operator "contains">
            <Value val "DrugX"/>
        </Condition>
        <Condition name "format" operator "EQ">
            <Value val "image/jpg"/>
        </Condition>
    </Condition>
    <ResultField name "format" />
    <ResultField name "name" />
    <ResultField name "content" />
</Query>
```

| Attribute Name | Value |
|---|---|
| Object_id | 5898823 |
| Name | DrugX_adverse_effects_query |

```
<Query type "study_data">
    <Condition operator "AND">
        <Condition name "study" operator "contains">
            <Value val "DrugX"/>
        </Condition>
        <Condition name "section" operator "EQ">
            <Value val "adverse_affects"/>
        </Condition>
    </Condition>
    <ResultField name "format" />
    <ResultField name "name" />
    <ResultField name "study" />
    <ResultField name "xml_content" />
</Query>
```

FIG. 13

```
<StudyData>
    <a href "score://objid:2349832" title "DrugX Image"/>
    <xi:include href "score://objid:4234342" />
</StudyData>
```
1400 → `<a href "score://objid:2349832" title "DrugX Image"/>`
1410 → `<xi:include href "score://objid:4234342" />`

FIG. 14

```
<StudyData>
    <a href "score://objid:2349832" title "DrugX Image"/>
    <Data>
        Adverse affects for this drug are listed here.
    </Data>
</StudyData>
```

FIG. 15

```
<StudyData>
    <a href "score://objid:2349832" title "DrugX Image"/>
    <Data>
        Adverse affects for this drug are: Drowsiness, Vomiting, and Diarrhea.
    </Data>
</StudyData>
```

FIG. 16

CONTENT MANAGEMENT SYSTEM THAT RETRIEVES DATA FROM AN EXTERNAL DATA SOURCE AND CREATES ONE OR MORE OBJECTS IN THE REPOSITORY

BACKGROUND

1. Technical Field

This disclosure generally relates to content management systems, and more specifically relates to a content management system that creates an object in its repository from data external to the content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the system. If a rule is satisfied, the CMS may perform subsequent processing on the content. Known content management systems may include rules related to bursting, linking, and synchronization. Bursting rules govern how a document is bursted, or broken into individual chunks, when the document is checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

The CMS provides many features that are very convenient when working with document-centric data. In known content management systems, if data from an external source is needed, a query embedded in a document or referenced by the document is executed to retrieve the desired data into the document. Such a query is hard-coded into the document itself or in a different document referenced in the document. After the query is run, the hard-coded query in the original document is replaced with the data that was returned from the external data source. Once embedded or referenced in the document, the CMS has no knowledge that this data came from an external source. As a result, the data returned from the external data source cannot be managed as an object in the CMS. Without a way for the CMS to manage data from an external source as objects, data from external data sources will not be able to be easily reused in the CMS.

BRIEF SUMMARY

A content management system (CMS) provides a way to include data from an external source as an object in the repository managed by the CMS. The CMS includes an external data mechanism that processes a document with a query to a data source external to the repository. The external data mechanism executes the query, and creates one or more objects in the repository according to the type of data returned as defined by classification rules. Each object containing data returned from the query is linked to that query via a formal relationship in the CMS. When an object that has a formal relationship with a query is checked out of the repository, the query corresponding to the object may be executed, and the data returned from the query may be stored in the object. In the alternative, the data may be used directly if a corresponding lifecycle policy indicates the corresponding query should not be executed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a flow diagram of a prior art method for using data from an external source;

FIG. 3 is a flow diagram of a method for importing data from an external source as a CMS object;

FIG. 8 shows a sample XML document containing queries;

FIG. 9 shows a sample set of classification rules;

FIG. 12 is a query object for the first query in FIG. 8;

FIG. 13 is a query object for the second query in FIG. 8;

FIG. 14 shows the sample XML document in FIG. 8 after processing the queries in FIG. 8 according to the classification rules in FIG. 9;

FIG. 15 is the XML document after the CMS reconstitutes the data; and

FIG. 16 is the XML document showing how content in a document may be updated when corresponding data at the external source has been updated.

DETAILED DESCRIPTION

The claims and disclosure herein provide a content management system (CMS) that creates one or more objects in the repository containing data returned from a query to an external data source according to the type of the data returned by comparing the data returned against classification rules.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
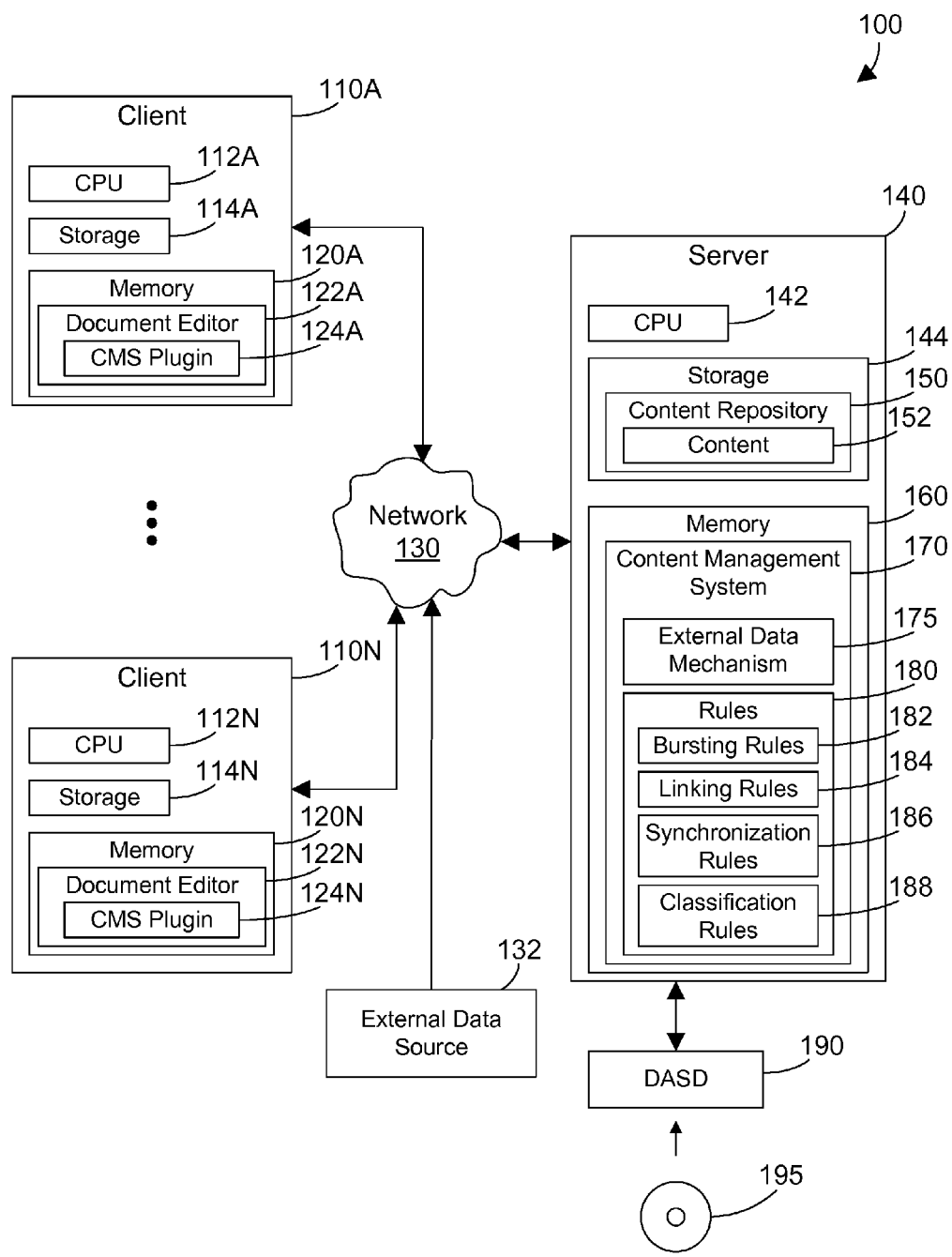
FIG. 1 is a block diagram of a networked computer system that includes a server computer system that has a content management system that includes an external data mechanism that stores data from an external source as an object in the repository.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes an external data mechanism 175 and rules 180.

External data mechanism 175 is used to execute queries designed to retrieve data from a source external to the CMS 170 and its associated repository 150, such as from external data source 132 shown in FIG. 1. External data source 132 represents any suitable source of data that is not controlled or managed by the CMS 170. One suitable example of an external data source 132 is a web page accessible via the internet. Another suitable example of an external data source 132 is a relational database. Note that a query to an external data source may include a query embedded in a first document, or may be a query in a second document that is referenced in the first document. Rules 180 include bursting rules 182, linking rules 184, synchronization rules 186, and classification rules 188. Of course, other rules, whether currently known or developed in the future, could also be included in rules 180.

Bursting rules 182, linking rules 184, and synchronization rules 186 are well-known in the art. Classification rules 188 are introduced herein, and contain information that tells the CMS what kind of object to create in the repository based on what kind of data is returned from a query, and how the data in the object should be referenced. For example, if a query returns a digital image in .jpg format, the classification rules will tell the CMS what kind of object to create to hold the .jpg image, and whether a document that references the object should include the object or should link to the object.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The external data mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Referring to FIG. 2, a prior art method 200 for importing data from an external source to a document begins by processing an XML document containing a query (step 210). The CMS then executes the query (step 220). The query results are then included in the document (step 230). Once the query results are included in the document in step 230, the CMS does not know the data came from an external data source, since the data, after being included in the document, looks no different than data generated by an author. As a result, once the data is retrieved and included in a document, the data is static and cannot change even if the data at the external data source changes.

The disclosure and claims herein create one or more objects in the repository from data retrieved from executing the query, thereby allowing the CMS to manage data retrieved from an external data source the same as for all data in its repository. Object(s) created from the data retrieved from an external data source is/are preferably separate from any objects that include the queries, allowing the CMS to provide all the management and control of the data returned from executing the queries.

Referring to FIG. 3, a method 300 for importing data from an external data source into a CMS object begins by processing a document containing a query (step 310). The query is then executed (step 320). If the data returned from the query does not satisfy the classification rules (step 330=NO), the query results are included in the document as in the prior art shown at step 230 in FIG. 2 (step 380). If the data returned from the query does satisfy the classification rules (step 330=YES), the resulting data is imported as its own CMS object (step 340). The classification rules are then used to determine how the data returned from the query should be referenced by the document (step 350). The query is then imported as its own CMS object (step 360), and the query object is bound to the returned data object (step 370). By storing both the data returned from the query in step 340 and the query itself in step 360 as objects, then creating a formal relationship between the two in step 370, the CMS can determine whether to use the existing data in the returned data object or whether to execute the associated query to retrieve fresh data from the external data source.

Figure 4:
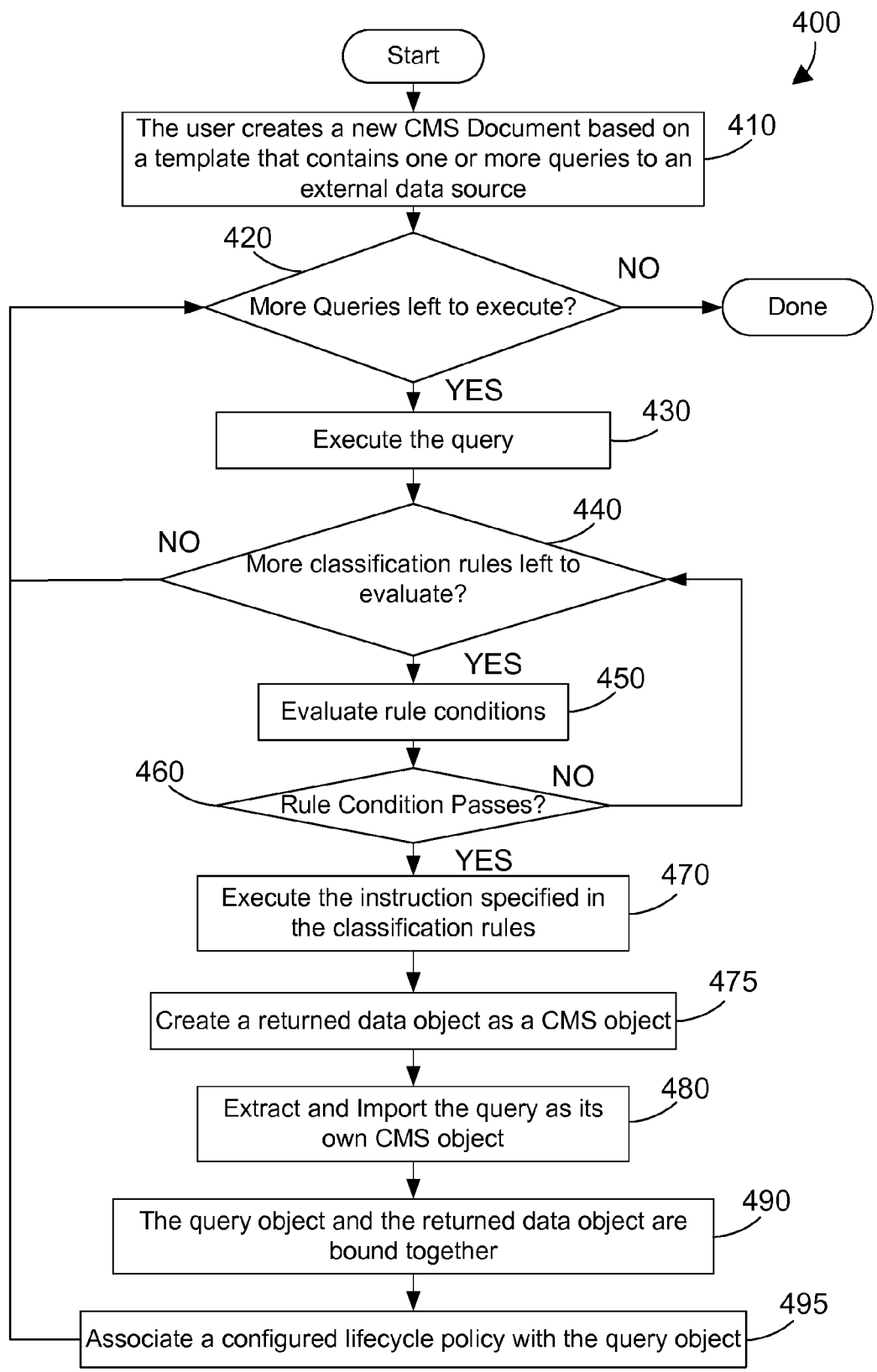
FIG. 4 is a flow diagram showing one specific implementation of the method of FIG. 3 when a document is created from a template that contains queries.

Referring to FIG. 4, method 400 is one suitable implementation for method 300 in FIG. 3. Method 400 begins when a user creates a new CMS document based on a template that contains one or more queries to an external source (step 410). If there is an unexecuted query (step 420=YES) then the query is executed (step 430). If there are no more classification rules left to evaluate (step 440=NO), method 400 goes to step 420. If there are remaining classification rules that need to be evaluated (step 440=YES) then the conditions in the classification rules are evaluated. If the rule condition passes (step 460=YES) then a corresponding instruction specified in the classification rules is executed (step 470). If the rule condition does not pass (step 460=NO), method 400 goes to step 440. After the instruction is executed in step 470, a returned data object is then created from the data returned from the execution of the query (step 475). Then the query is extracted from the document and imported into the CMS repository as its own object (step 480). Then the query object and the returned data object are bound together (step 490). A lifecycle policy is then configured and is associated with the query object (step 495). The document is then checked for additional queries (step 420), and if none exist (step 420=NO) then the method 400 is done.

Figure 5:
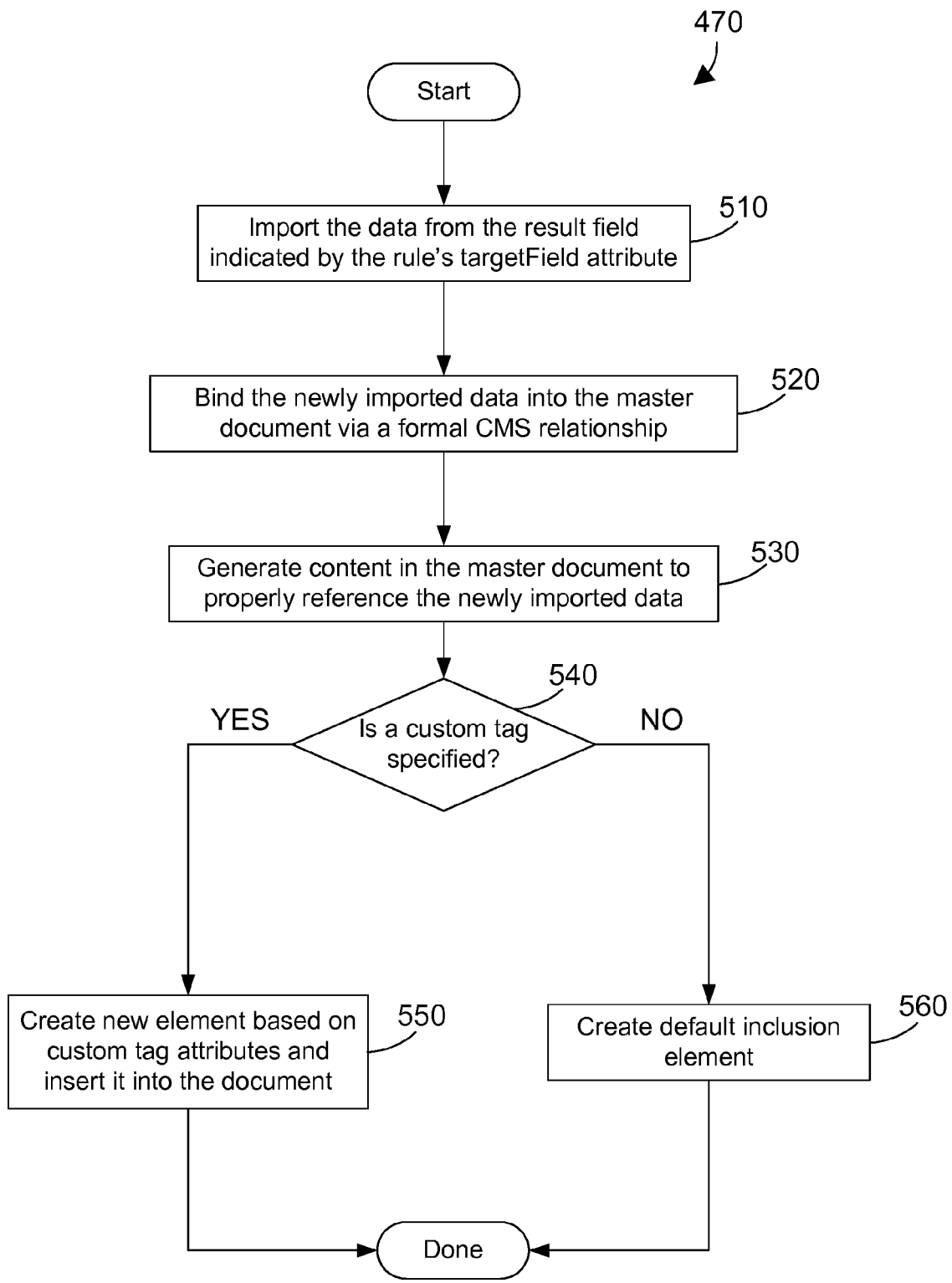
FIG. 5 is a flow diagram of a method that shows one suitable implementation for step 470 in FIG. 4.

Referring to FIG. 5, method 470 illustrates one possible implementation for step 470 in FIG. 4. Method 470 in FIG. 5 begins by importing the data from the result field indicated by the rule's targetField attribute (step 510). Then the newly imported data is bound into the master document via a formal relationship (step 520), such as a compound document relationship or a peer-to-peer relationship. XML content is generated in the master document to properly reference the newly imported data (step 530). If a custom tag is specified (step 540=YES), a new object based on the custom tag attributes is created and inserted into the document (step 550). If a custom tag is not specified (step 540=NO), a default inclusion element is created according to the system's configuration (step 560). The object being inserted into the document allows the returned data to be chunked into its own object in the repository when the document is checked into the repository by the CMS. The returned data object is linked to the query object. Each time the data from the external source is needed, the returned data object can be checked out of the repository and inserted into a document. Before the returned data object is included in the document, the query object linked to the returned data object may be executed, and the returned data object may be updated to include the data from executed query. This allows the CMS to reference data in an external data source, and when the data from that external source is changed, the CMS can update the local copy so that the data is current.

Figure 6:
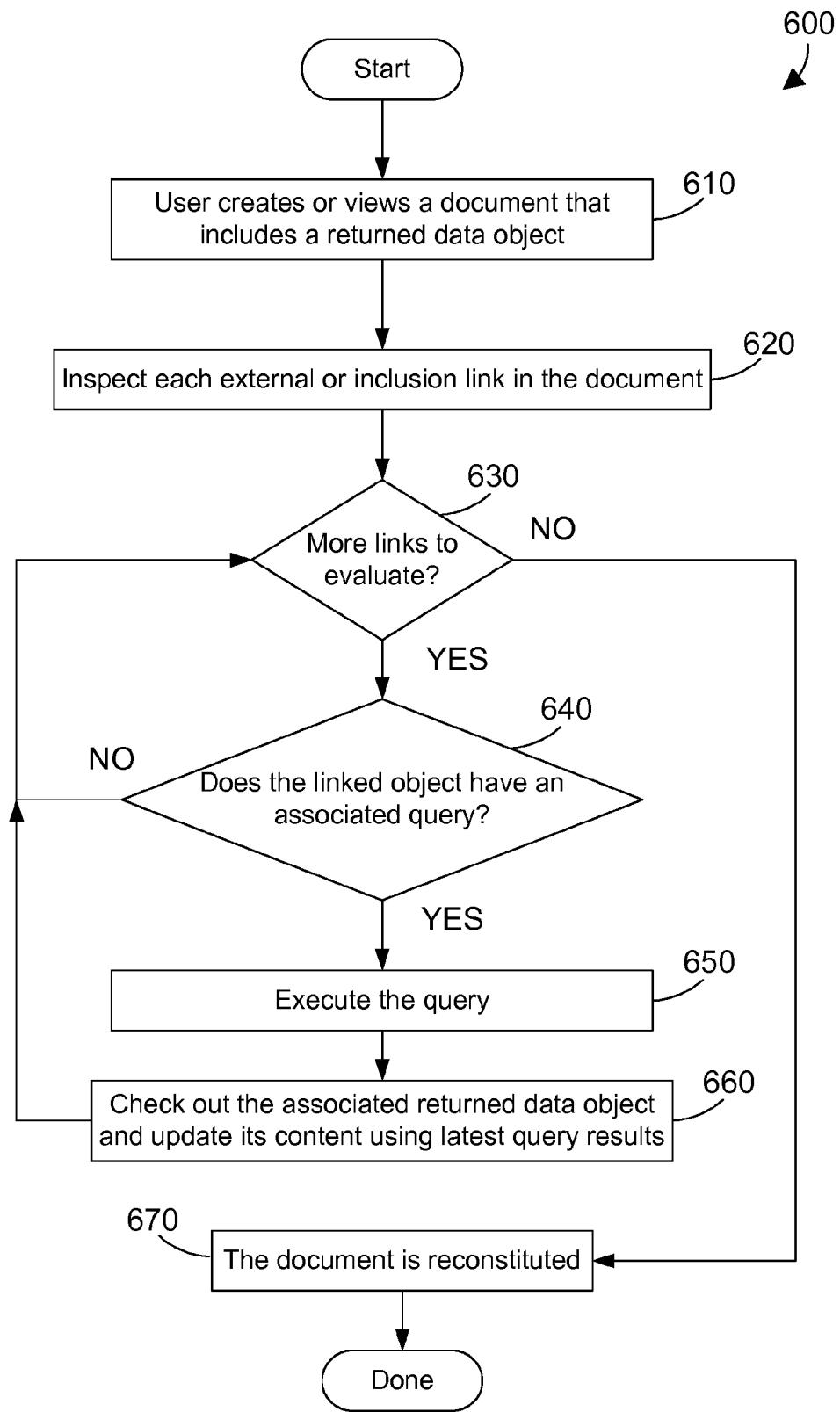
FIG. 6 is a flow diagram of a method for dynamically updating the contents of objects in the repository that are linked to queries.

Referring to FIG. 6, a method for updating the contents of the returned data objects in the repository begins by a user creating or viewing a document that includes a returned data object (step 610). Each external or inclusion link in the document is inspected (step 620). If there are more links to evaluate (step 630=YES), method 600 goes to step 640. If the linked object has an associated query (step 640=YES), the query is executed (step 650). The associated returned data object is checked out and updated with the latest query results (step 660), and the method returns to check for more links to evaluate (step 630). If there are no more links left to evaluate (step 630=NO), the document is reconstituted (step 670). If the linked object does not have an associated query (step 640=NO), method 600 goes to step 630.

Method 600 above assumes that returned data objects are linked to a corresponding query object when the query object needs to be executed, such as when the lifecycle policy specifies the query needs to be executed. When the query in the query object does not need to be executed, the link between the returned data object and the query object is broken. Thus, in step 640 in FIG. 6, if a linked object has an associated query, this means the query needs to be executed (step 650). If a linked object does not have an associated query, this means the data in the linked object may be used without executing a query. Note that method 600 is specific to a particular implementation that breaks links between a returned data object and its corresponding query object when the query in the query object no longer needs to be executed. Other implementations could use different logic to determine whether or not to execute a query associated with a returned data object, and the disclosure and claims herein expressly extend to any suitable implementation.

Because the external data mechanism disclosed herein creates and links together a query object with an associated returned data object, the CMS may need to execute the query in the query object in some circumstances, and may need to use the data in the return data object without executing the corresponding query in other circumstances. A lifecycle policy may be defined that specifies when to execute the query and when to use the existing data. For example, a lifecycle policy may be used to prevent changes to the final draft of a book or manual by locking down the local copy of the data so updates would no longer happen.

Figure 7:
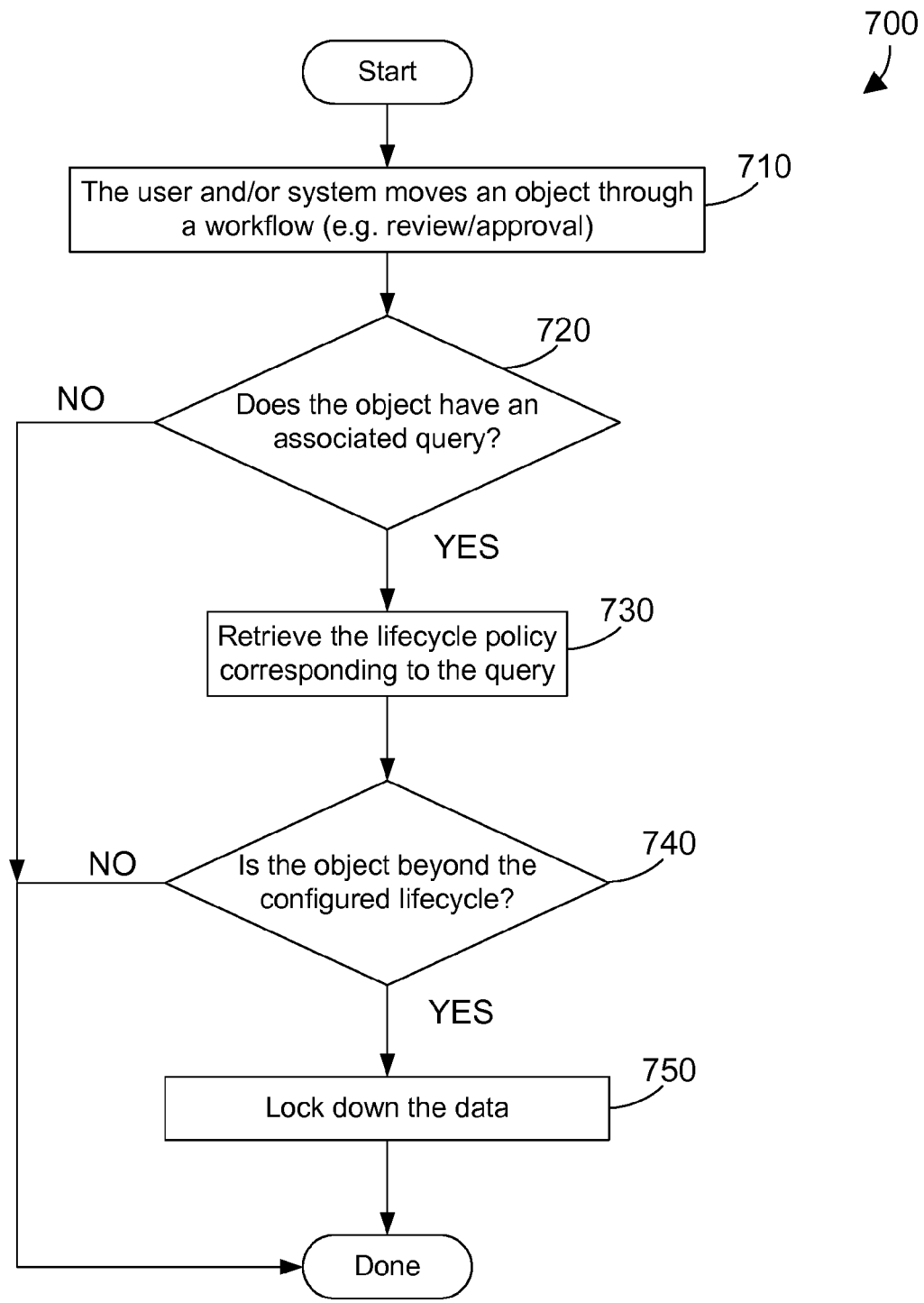
FIG. 7 is a flow diagram of a method for locking down objects in the repository that are linked to queries so the objects can no longer be updated.

Referring to FIG. 7, a method 700 for locking down the objects in the repository so they can no longer be updated begins with a user or system moving an object through a workflow, meaning to either review or edit the document containing the returned data object (step 710). If the object has a related query object (step 720=YES), the lifecycle corresponding to the query object is retrieved (step 730). If the query object is beyond the configured lifecycle (step 740=YES), the data is locked down (step 750) and the method is done. The locking down of the data in step 750 is performed by indicating to the CMS to always use the existing data in the return data object and to not execute the corresponding query. If the object does not have a related query object (step 720=NO) or the query object is not beyond the configured lifecycle (step 740=NO) then the method 700 is done.

The disclosure and claims herein recognize many different ways to lock down the data in step 750. One suitable implementation would be to break the relationship between the query object and the returned data object. This would make it so that the returned data object no longer has a related query object, making it just like any other object in the repository. Another suitable implementation would be to import the query into the document instead of the returned data object when the lifecycle policy indicates the query object should be executed, and when the data needed to be locked down, the query would be overwritten with the contents of the returned data object. These are not the only methods to accomplish the task of locking the data down, and the scope of the disclosure and claims herein extend to any way to indicate when to execute a query and when to use existing data, whether currently known or developed in the future.

A simple example is now given to illustrate the methods in FIGS. 3-7. A user starts with an XML document containing queries (step 410 in FIG. 4). A sample XML document 800 is shown in FIG. 8, for the present example. The XML document in FIG. 8 contains two queries. The first query 810 looks for a JPG file for the "DrugX" study, while the second query 820 looks for an XML fragment containing an adverse affects section for the "DrugX" study. Next the external data mechanism (e.g., 175 in FIG. 1) processes the XML document 800 and executes the queries (step 430 in FIG. 4). FIG. 9 is an example of sample classification rules, for the example herein. The external data mechanism uses these classification rules to determine how to store the returned data from the query in the CMS repository (step 450 in FIG. 4). Applicability column 910 represents an XPath expression for identifying a query element within a source XML document. In the current example, after the query has been executed, the results would be stored at the specified XPath. Because both queries 810 and 820 in document 800 have a query type of "study_data", both satisfy the criteria in the Applicability column 910 of the classification rules shown in FIG. 9. Conditions column 920 describes conditions that must be met in order for a returned data object to be created in the repository. Each RuleCondition element references an instruction which defines how to create the returned data object and alter the source document. In the current example two separate rule conditions are defined. The first rule applies to the target data identified by the result field named "content". If the result field named "format" contains a value of "image/jpg" (step 460=YES in FIG. 4), then Instruction 1 should be executed (step 470 in FIG. 4). The second rule applies to the target data identified by the result field named "xml_content". If the result field named "format" contains a value of "text/xml" (step 460=YES in FIG. 4), then Instruction 2 should be executed (step 470 in FIG. 4).

Instruction 1 and Instruction 2 are shown in Instructions column 930 in FIG. 9. The Instructions column 930 indicates how the returned data should be created, and how the source document should be updated when the conditions in Conditions column 920 are met. Both Instruction 1 and Instruction 2 contain an ImportDescriptor element. The ImportDescriptor element defines the initial CMS attributes that should be applied to the returned data when it is included in the repository as a returned data object. Instruction 1 states that a link to the data external to the CMS should be created within the source document via the GeneratedContent element. The returned data object's type attribute indicates that the inclusion mechanism is a link, meaning the content is not included directly into the document. The context is "replace", meaning that the created returned data object should replace the query in the source document. Values for the context attribute contain, but are not limited to "replace", "around", "above", and "below". The context attribute indicates where to place the returned data object in relation to the query. For Instruction 1, a custom tag is inserted so that the link appears in general as: <a href="repository_specific_link_is_inserted_here">name of object</a>. In the current example, the link created in the source document is link 1400 shown in FIG. 14. The linkAttribute attribute on the CustomTag element indicates to the CMS where it needs to insert the repository specific link. Instruction 2 is simpler. Instruction 2 simply indicates that the generated content type should be "include" and that the included element should replace the query. No custom tag was declared for Instruction 2, so the CMS will use the default include mechanism, namely an XInclude statement for the specific example shown, to update the source document.

Figure 10:
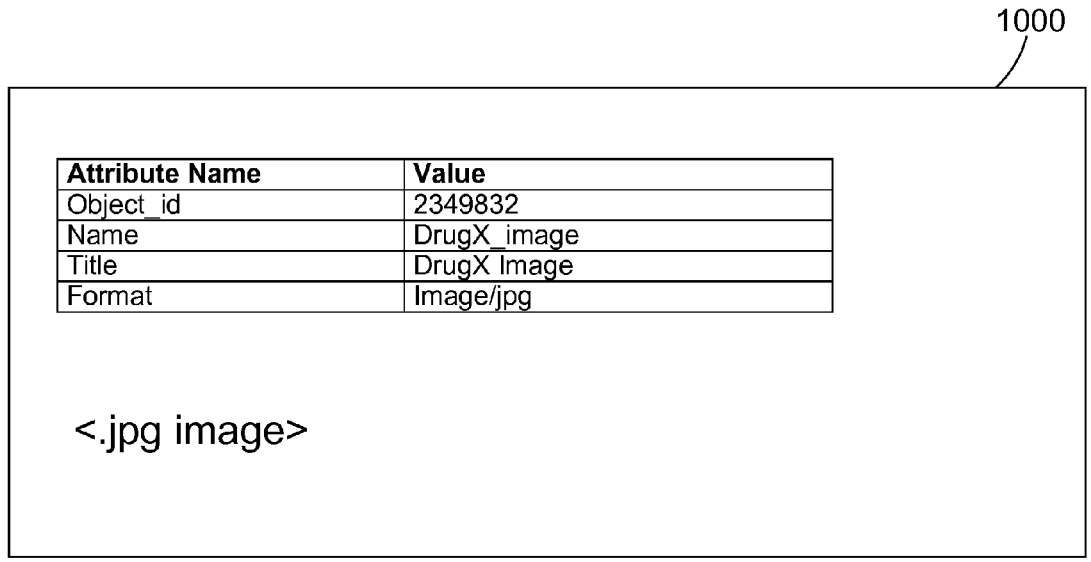
FIG. 10 is the returned data object in the repository for a sample JPG file.
Figure 11:
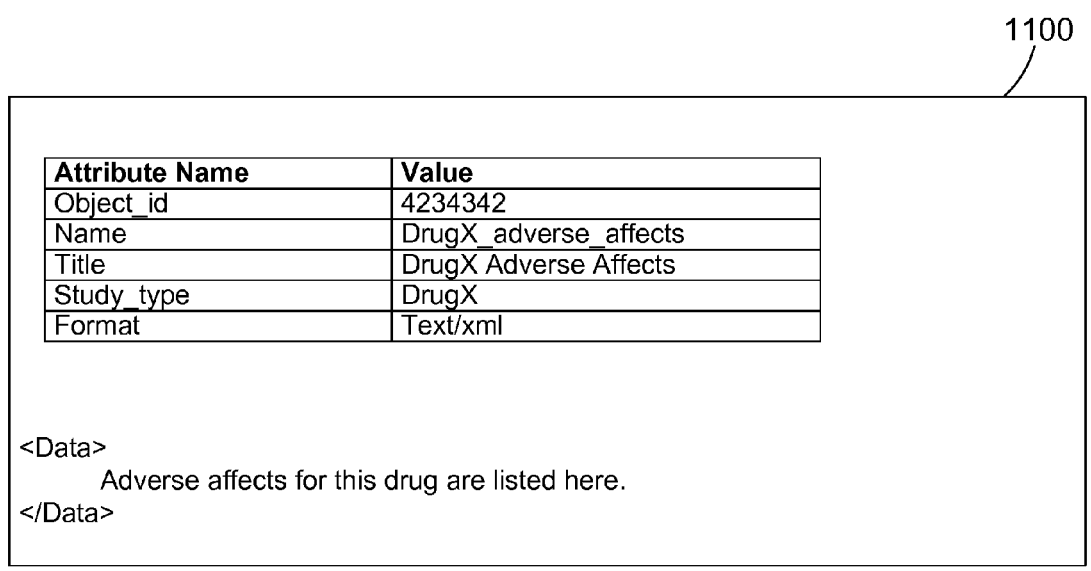
FIG. 11 is the returned data object in the repository for a sample XML file.

When the queries 810 and 820 in document 800 are executed in light of the classification rules in FIG. 9, the result will be the creation by the CMS of a first object to hold the .jpg file corresponding to the drug image retrieved when executing the first query 810 (step 475 in FIG. 4), a second object to hold the XML fragment for the adverse effects of DrugX (step 475 in FIG. 4), a third object to hold the query 810 (step 480 in FIG. 4), and a fourth object to hold the query 820 (step 480 in FIG. 4). Each object includes corresponding metadata as shown in the figures. FIG. 10 shows the JPG file object 1000 with its corresponding metadata. FIG. 11 shows XML fragment object 1100 with its corresponding metadata. The JPG query object 1200 shown in FIG. 12 contains the query 810 from the original sample XML document 800 shown in FIG. 8, with associated metadata. The XML fragment query object 1300 in FIG. 13 contains the query 820 from the original sample XML document 800 shown in FIG. 8, with its associated metadata.

The system then binds each query object to its respective returned data object (step 490 in FIG. 4). In the present example, the JPG file object 1000 (Object_id 2349832) is bound or linked to the JPG query object 1200 (Object_id 5898822), and the XML fragment object 1100 (Object_id 4234342) is bound or linked to the XML fragment query object 1300 (Object_id 5898823). The XML document 800 (originally FIG. 8) is then updated to reflect the classification of the imported data, as seen in FIG. 14. Notice the XML document now references objects in the repository, and does not contain queries. In FIG. 14, the JPG file object 1000 is referenced using a link at 1400, and the XML fragment object 1100 is referenced as an XInclude element at 1410.

Whenever the XML document is subsequently reconstituted, whether to view or edit, the lifecycle policy corresponding to the query object is read to determine whether to execute the query in the query object or whether to use the data in the returned data object without executing the corresponding query. If the lifecycle policy specifies to execute the query, the query in the query object is executed. The returned data object's content is then updated using the returned data from executing the query. The document is then populated using the content, as shown in FIG. 15.

Now let us assume that the adverse affects data has been updated at the external data source. The user then views a document that includes the link to the external data source that has been updated (step 610 in FIG. 6). We assume the link has an associated query (step 640=YES in FIG. 6). The query is executed (step 650 in FIG. 6), and the associated returned data object is checked out and updated using the latest query results (step 660 in FIG. 6). The user will then see the updated data automatically as shown in FIG. 16. The user can then have the most current data, even if the data has been recently modified in the external data source.

In the event that the returned data object is locked down, the binding between the query object and the returned data object is broken (step 750 in FIG. 7). When the returned data object is subsequently included in a document, it no longer has a query object bound to it (step 640=NO), so the returned data object is included in the document instead of executing a corresponding query. The external data mechanism simply makes a local copy in the repository of the data in the external data source that is not updated as the external data source is updated.

The disclosure herein assumes a lifecycle policy is associated with a query object to determine when to execute the query in the query object. This lifecycle policy allows the data to be locked down by specifying the query in the query object is not to be executed, which will cause the data in the returned data object to be used instead. Note, however, the lifecycle policy could instead be associated with the returned data object to determine when to use the data in the returned data object. If the lifecycle policy specifies to not use the data in the returned data object, this means the query in the query object needs to be executed. The disclosure and claims herein expressly extend to any suitable implementation of a lifecycle that indicates when to execute a query in the query object and when to use the data in the returned data object.

The disclosure herein including the drawings shows a preferred implementation where the external data mechanism creates two linked objects, namely: 1) a query object that contains a query or links to a query; and 2) a returned data object that contains the data that was retrieved from the external data source as a result of executing the query. Note, however, that this implementation can change within the scope of the disclosure and claims herein. For example, a single object could be created in the repository that includes both the query and the returned data, with a flag or some other indication in the object's metadata that indicates when to execute the query and when to use the returned data without executing the query.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

The invention claimed is:

1. A computer-implemented method for a content management system that manages a plurality of objects in a repository to reference a data source external to the repository, the method comprising the steps of:
    processing a document containing a query to the data source;
    executing the query;
    creating from the query a query object in the repository that is separate from the document and contains the query;
    creating from the data returned from the query a returned data object in the repository that is separate from the document, wherein the returned data object is created in the repository according to classification rules that determine from a type of the data returned from the query a corresponding type for the returned data object;
    creates a link between the query object and the returned data object;
    creating a lifecycle corresponding to the query object that specifies at least one condition;
    when the at least one condition is satisfied, the query in the query object is executed, the returned data object is updated with the query results, and the updated data in the returned data object is used; and
    when the at least one condition is not satisfied, the link between the query object and the returned data object is broken to lock down the returned data object to prevent the update, the query in the query object is not executed and existing data in the returned data object is used.

2. The method of claim 1 further comprising the step of storing the query object and the returned data object in the repository with a corresponding relationship.

3. The method of claim 1 further comprising the steps of:
    when the lifecycle corresponding to the query object specifies the query in the query object is to be executed, updating the returned data object with results of executing the query; and
    when the lifecycle corresponding to the query object specifies the query in the query object is not to be executed, the query object is updated to contain the data in the returned data object.

4. A computer-implemented method for a content management system that manages a plurality of objects in a repository to reference a data source external to the repository, the method comprising the steps of:
- providing a repository residing in a memory that includes a plurality of objects;
- executing by at least one processor a content management system residing in the memory, the content management system managing the plurality of objects in the repository, the content management system performing the steps of:
  - when checking into the repository an XML document that contains a query, performing the steps of:
    - executing the query;
    - evaluating data returned from the query to determine whether the data satisfies classification rules;
    - when the data satisfies the classification rules, performing the steps of:
      - creating a returned data object in the repository containing the data;
      - creating a query object in the repository containing the query;
      - replacing the query in the XML document with a link to the retuned data object;
      - creating a link between the query object and the returned data object;
      - configuring a lifecycle policy corresponding to the query object that determines when the query in the query object is executed;
    - when the data does not satisfy the classification rules, performing the step of:
      - importing the data directly into the XML document;
  - when checking the returned data object out of the repository, performing the steps of:
    - determine from the lifecycle policy corresponding to the query object whether the query in the query object should be executed;
    - when the query in the query object should be executed, performing the step of updating the returned data object with results of executing the query within the query object with the link to the returned data object; and
    - when the query in the query object should not be executed, performing the step of breaking the link between the query object and the returned data object.

* * * * *